US009530135B2

(12) United States Patent
Lai

(10) Patent No.: US 9,530,135 B2
(45) Date of Patent: Dec. 27, 2016

(54) METHOD, APPARATUS, AND NETWORK SYSTEM FOR DISPLAYING SECURITY IDENTIFIER ON PAGE

(71) Applicant: TENCENT TECHNOLOGY (SHENZHEN) COMPANY LIMITED, Shenzhen (CN)

(72) Inventor: Zhonghua Lai, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/105,015

(22) PCT Filed: Jan. 8, 2015

(86) PCT No.: PCT/CN2015/070385
§ 371 (c)(1),
(2) Date: Jun. 16, 2016

(87) PCT Pub. No.: WO2015/103991
PCT Pub. Date: Jul. 16, 2015

(65) Prior Publication Data
US 2016/0314470 A1 Oct. 27, 2016

(30) Foreign Application Priority Data
Jan. 9, 2014 (CN) .......................... 2014 1 0009997

(51) Int. Cl.
G06F 21/55 (2013.01)
G06Q 20/40 (2012.01)
(52) U.S. Cl.
CPC ................. G06Q 20/4014 (2013.01)
(58) Field of Classification Search
CPC ..................................... G06F 21/55
See application file for complete search history.

(56) References Cited

U.S. PATENT DOCUMENTS

2004/0098313 A1* 5/2004 Agrawal ............... G06Q 20/00
705/51
2005/0235044 A1* 10/2005 Tazuma ............ G06F 17/30887
709/217

(Continued)

FOREIGN PATENT DOCUMENTS

CN 103116725 A 5/2013
WO WO-2013/037304 A1 3/2013

OTHER PUBLICATIONS

International Search Report and Written Opinion, International application No. PCT/CN2015/070385, mailed Apr. 16, 2015.

Primary Examiner — Izunna Okeke
Assistant Examiner — Ali Shayanfar
(74) Attorney, Agent, or Firm — Marshall, Gerstein & Borun LLP

(57) ABSTRACT

The present disclosure discloses a method, an apparatus, and a network system for displaying a security identifier on a page. The method includes: receiving a display request for a numerical value transfer page, where the display request at least carries link information of the numerical value transfer page and a numerical value transfer object identifier of the numerical value transfer page, and the link information of the numerical value transfer page includes domain name information of a domain name to which the numerical value transfer page belongs; determining, according to a preset correspondence between a transfer object identifier and domain name information, whether the link information of the numerical value transfer page matches domain name information corresponding to the transfer object identifier; if yes, when displaying the numerical value transfer page, displaying a security identifier in a page function type identifier column on an interface of a client.

8 Claims, 5 Drawing Sheets

(56) References Cited

U.S. PATENT DOCUMENTS

| | | |
|---|---|---|
| 2009/0094150 A1 | 4/2009 | Feng et al. |
| 2009/0112789 A1* | 4/2009 | Oliveira ............... H04L 67/1095 |
| 2009/0112880 A1* | 4/2009 | Oliveira ............ G06F 17/30091 |
| 2011/0029568 A1* | 2/2011 | Muraki ..................... G06F 8/71 |
| | | 707/792 |
| 2011/0087610 A1 | 4/2011 | Batada et al. |
| 2013/0188707 A1* | 7/2013 | Shimizu ............. H04N 13/0048 |
| | | 375/240.12 |
| 2014/0046927 A1* | 2/2014 | Nelke ............... G06F 17/30979 |
| | | 707/713 |
| 2016/0063541 A1* | 3/2016 | Geng .................. H04L 63/1483 |
| | | 705/14.47 |

* cited by examiner

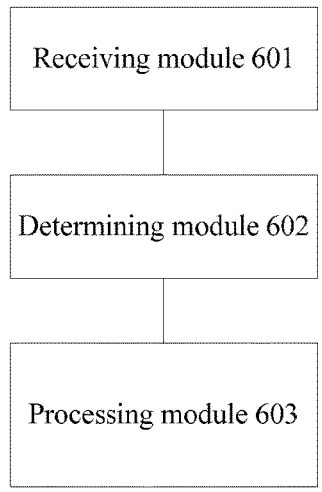

FIG. 6

A client sends a display request for a numerical value transfer page to a server, where the display request at least carries link information of the numerical value transfer page and a numerical value transfer object identifier of the numerical value transfer page, and the link information of the numerical value transfer page includes domain name information of a domain name to which the numerical value transfer page belongs    ⸺ 701

When receiving the display request, the server determines, according to a preset correspondence between a transfer object identifier and domain name information, whether the link information of the numerical value transfer page matches domain name information corresponding to the transfer object identifier    ⸺ 702

If the link information of the numerical value transfer page matches the domain name information corresponding to the transfer object identifier, the server determines whether the link information of the numerical value transfer page includes a specified parameter    ⸺ 703

If the link information of the numerical value transfer page includes the specified parameter, the server sends a security identifier display instruction to the client    ⸺ 704

When receiving the security identifier display instruction, when displaying the numerical value transfer page, the client displays a security identifier in a page function type identifier column on an interface of the client    ⸺ 705

FIG. 7

METHOD, APPARATUS, AND NETWORK SYSTEM FOR DISPLAYING SECURITY IDENTIFIER ON PAGE

RELATED APPLICATIONS

This application is a national phase of International Application PCT/CN2015/070385 filed Jan. 8, 2015 which claims benefit of and priority to Chinese Patent Application No. 201410009997.7 filed on Jan. 9, 2014, entitled "Method, Apparatus, and Network System for Displaying Security Identifier on Page". The entire disclosures of each of the above applications are incorporated by reference herein.

FIELD

The present disclosure relates to the field of network technologies, and in particular, to a method, an apparatus, and a network system for displaying a security identifier on a page.

BACKGROUND

With the development of network technologies, network transactions are increasingly prevalent, and a payment scenario of transferring a numerical value is inevitably involved in network transactions. For example, a service provider provides a service or a resource, and a user performs a payment by using real or virtual currency in a personal account, or performs an exchange by using credits.

Because of the complexity of a network environment, with the advent of a payment scenario, many fake web pages also appear. A display form of a fake web page is very similar to display of a web page in an actual payment scenario, but a discrimination degree and the security are both low, a monetary loss may be caused once a user does not recognize the fake web page.

SUMMARY

According to one aspect, a method for displaying a security identifier on a page is provided, where the method includes:

receiving a display request for a numerical value transfer page, where the display request at least carries link information and a numerical value transfer object identifier of the numerical value transfer page, and the link information of the numerical value transfer page includes domain name information of a domain name to which the numerical value transfer page belongs;

determining, according to a preset correspondence between a transfer object identifier and domain name information, whether the link information of the numerical value transfer page matches domain name information corresponding to the transfer object identifier;

if the link information of the numerical value transfer page matches the domain name information corresponding to the transfer object identifier, determining whether the link information of the numerical value transfer page includes a specified parameter; and if the link information of the numerical value transfer page includes the specified parameter, when displaying the numerical value transfer page in a client, displaying a security identifier in a page function type identifier column on an interface of the client.

According to another aspect, an apparatus for displaying a security identifier on a page is provided, where the apparatus includes:

a receiving module, receiving a display request for a numerical value transfer page, where the display request at least carries link information and a numerical value transfer object identifier of the numerical value transfer page, and the link information of the numerical value transfer page includes domain name information of a domain name to which the numerical value transfer page belongs;

a determining module, configured to determine, according to a preset correspondence between a transfer object identifier and domain name information, whether the link information of the numerical value transfer page matches domain name information corresponding to the transfer object identifier, where the determining module is further configured to: if the link information of the numerical value transfer page matches the domain name information corresponding to the transfer object identifier, determine whether the link information of the numerical value transfer page includes a specified parameter; and a processing module, configured to: if the link information of the numerical value transfer page includes the specified parameter, when displaying the numerical value transfer page in a client, display a security identifier in a page function type identifier column on an interface of the client.

According to still another aspect, a method for displaying a security identifier on a page is provided, where the method includes:

sending, by a client, a display request for a numerical value transfer page to a server, where the display request at least carries link information of the numerical value transfer page and a numerical value transfer object identifier of the numerical value transfer page, and the link information of the numerical value transfer page includes domain name information of a domain name to which the numerical value transfer page belongs;

when receiving the display request, determining, by the server according to a preset correspondence between a transfer object identifier and domain name information, whether the link information of the numerical value transfer page matches domain name information corresponding to the transfer object identifier;

if the link information of the numerical value transfer page matches the domain name information corresponding to the transfer object identifier, determining, by the server, whether the link information of the numerical value transfer page includes a specified parameter;

if the link information of the numerical value transfer page includes the specified parameter, sending, by the server, a security identifier display instruction to the client; and when receiving the security identifier display instruction, when displaying the numerical value transfer page, displaying, by the client, a security identifier in a page function type identifier column on an interface of the client.

According to yet another aspect, the system is provided, including: a client and a server, where the client is configured to send a display request for a numerical value transfer page to the server, where the display request at least carries link information of the numerical value transfer page and a numerical value transfer object identifier of the numerical value transfer page, and the link information of the numerical value transfer page includes domain name information of a domain name to which the numerical value transfer page belongs;

the server is configured to: when receiving the display request, determining, according to a preset correspondence between a transfer object identifier and domain name information, whether the link information of the numerical value transfer page matches domain name information corresponding to the transfer object identifier; if the link information of the numerical value transfer page matches the domain name information corresponding to the transfer object identifier, determine whether the link information of the numerical value transfer page includes a specified parameter; and if the link information of the numerical value transfer page includes the specified parameter, send a security identifier display instruction to the client; and the client is further configured to: when receiving the security identifier display instruction, when displaying the numerical value transfer page, display a security identifier in a page function type identifier column on an interface of the client.

According to the above-described aspects of method, apparatus, and network system for displaying a security identifier on a page that are provided by the embodiments of the present disclosure, a display request for a numerical value transfer page is received, where the display request at least carries link information and a numerical value transfer object identifier of the numerical value transfer page, and the link information of the numerical value transfer page includes domain name information of a domain name to which the numerical value transfer page belongs; it is determined, according to a preset correspondence between a transfer object identifier and domain name information, whether the link information of the numerical value transfer page matches domain name information corresponding to the transfer object identifier; if the link information of the numerical value transfer page matches the domain name information corresponding to the transfer object identifier, it is determined whether the link information of the numerical value transfer page includes a specified parameter; and if the link information of the numerical value transfer page includes the specified parameter, when the numerical value transfer page is displayed in a client, a security identifier is displayed in a page function type identifier column on an interface of the client. By using the technical solutions provided by the embodiments of the present disclosure, based on verification on domain name information, link information of a numerical value transfer page is further verified; it is determined, based on whether a specified parameter is included, whether the numerical value transfer page is a page determined by using a numerical value transfer object identifier; when both the verification on the domain name information and the verification on the link information succeed, a security identifier is displayed in a page function type identifier column, which is not easily changed by the outside, on an interface of a client; and the security identifier is displayed in an embedded manner, thereby avoiding web page faking, and improving the security of the numerical value transfer page.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 6 is a schematic structural diagram of an apparatus for displaying a security identifier on a page according to an embodiment of the present disclosure;

FIG. 7 is a flowchart of a method for displaying a security identifier on a page according to an embodiment of the present disclosure.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
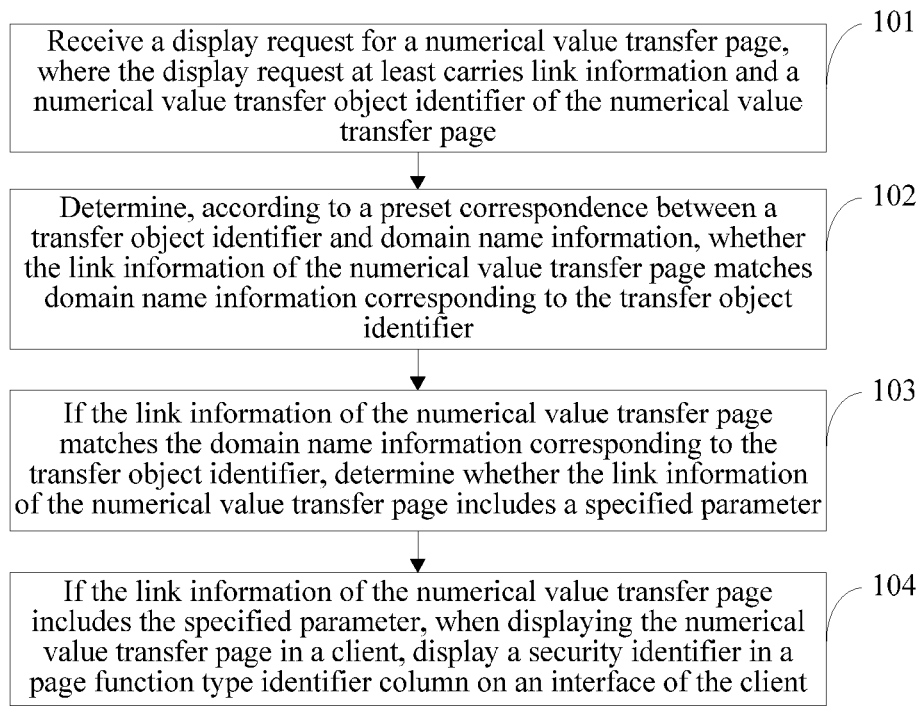
FIG. 1 is a flowchart of a method for displaying a security identifier on a page according to an embodiment of the present disclosure.

FIG. 1 is a flowchart of a method for displaying a security identifier on a page according to an embodiment of the present disclosure. Referring to FIG. 1, this embodiment specifically includes:

101: Receive a display request for a numerical value transfer page, where the display request at least carries link information and a numerical value transfer object identifier of the numerical value transfer page, and the link information of the numerical value transfer page includes domain name information of a domain name to which the numerical value transfer page belongs.

102: Determine, according to a preset correspondence between a transfer object identifier and domain name information, whether the link information of the numerical value transfer page matches domain name information corresponding to the transfer object identifier.

103: If the link information of the numerical value transfer page matches the domain name information corresponding to the transfer object identifier, determine whether the link information of the numerical value transfer page includes a specified parameter.

104: If the link information of the numerical value transfer page includes the specified parameter, when displaying the numerical value transfer page in a client, display a security identifier in a page function type identifier column on an interface of the client.

According to the method provided by this embodiment of the present disclosure, based on verification on domain name information, link information of a numerical value transfer page is further verified; it is determined, based on whether a specified parameter is included, whether the numerical value transfer page is a page determined by using a numerical value transfer object identifier; when both the verification on the domain name information and the verification on the link information succeed, a security identifier is displayed in a page function type identifier column, which is not easily changed by the outside, on an interface of a client; and the security identifier is displayed in an embedded manner, thereby avoiding page faking, such as web page faking on internet, and improving the security of the numerical value transfer page. The numerical value transfer is a process of transferring objects such as virtual currency or currency during exchanging or dealing in business.

Figure 2:
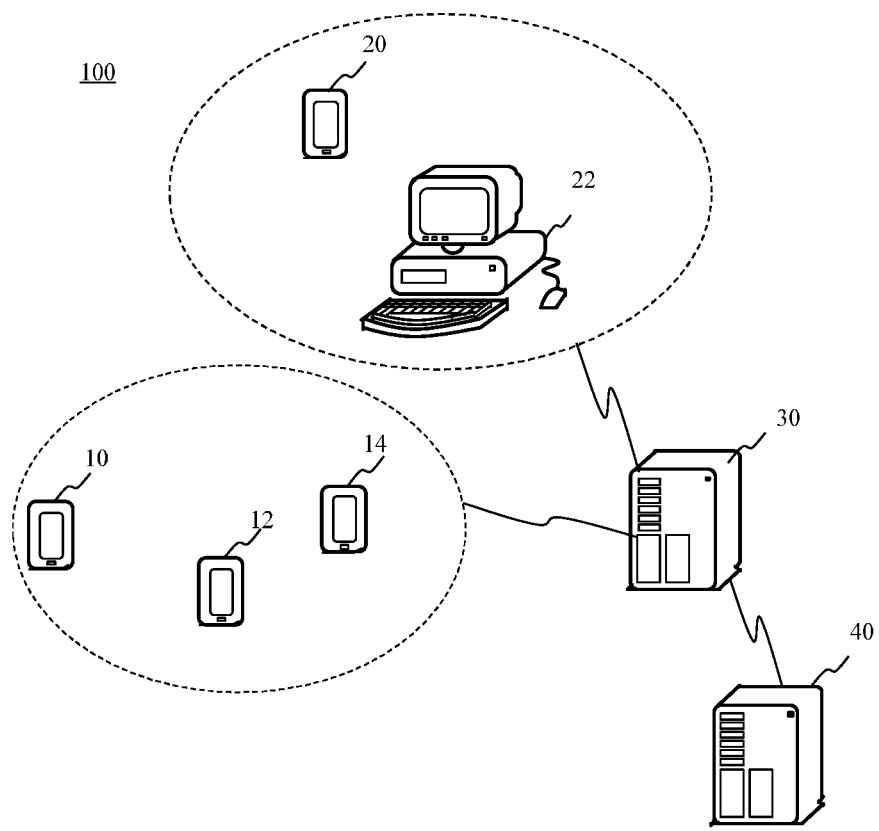
FIG. 2 is a structural diagram of a network system according to an embodiment of the present disclosure.

FIG. 2 is a structural diagram of a network system according to an embodiment of the present disclosure. Referring to FIG. 2, the exemplary network system 100 includes various clients 10, 12, 14, 20, 22 participating in business exchanging or business dealing, a first server 30, and a second server 40. The clients refer to, a client terminal device, which includes but is not limited to, a desktop computer, a laptop, a notebook, a tablet, a mobile phone, a multimedia TV and other electronic equipment, or a client side application program. For example, the client is an instant messaging client device. Correspondingly, the first server 30 matching with the client is an instant messaging server serving the client, and the second server 40 is connected to the first server 30, maintains a correspondence between a numerical value transfer object identifier and link information for the first server 30, and provides link information verification for the first server 30 based on the correspondence.

Figure 3:
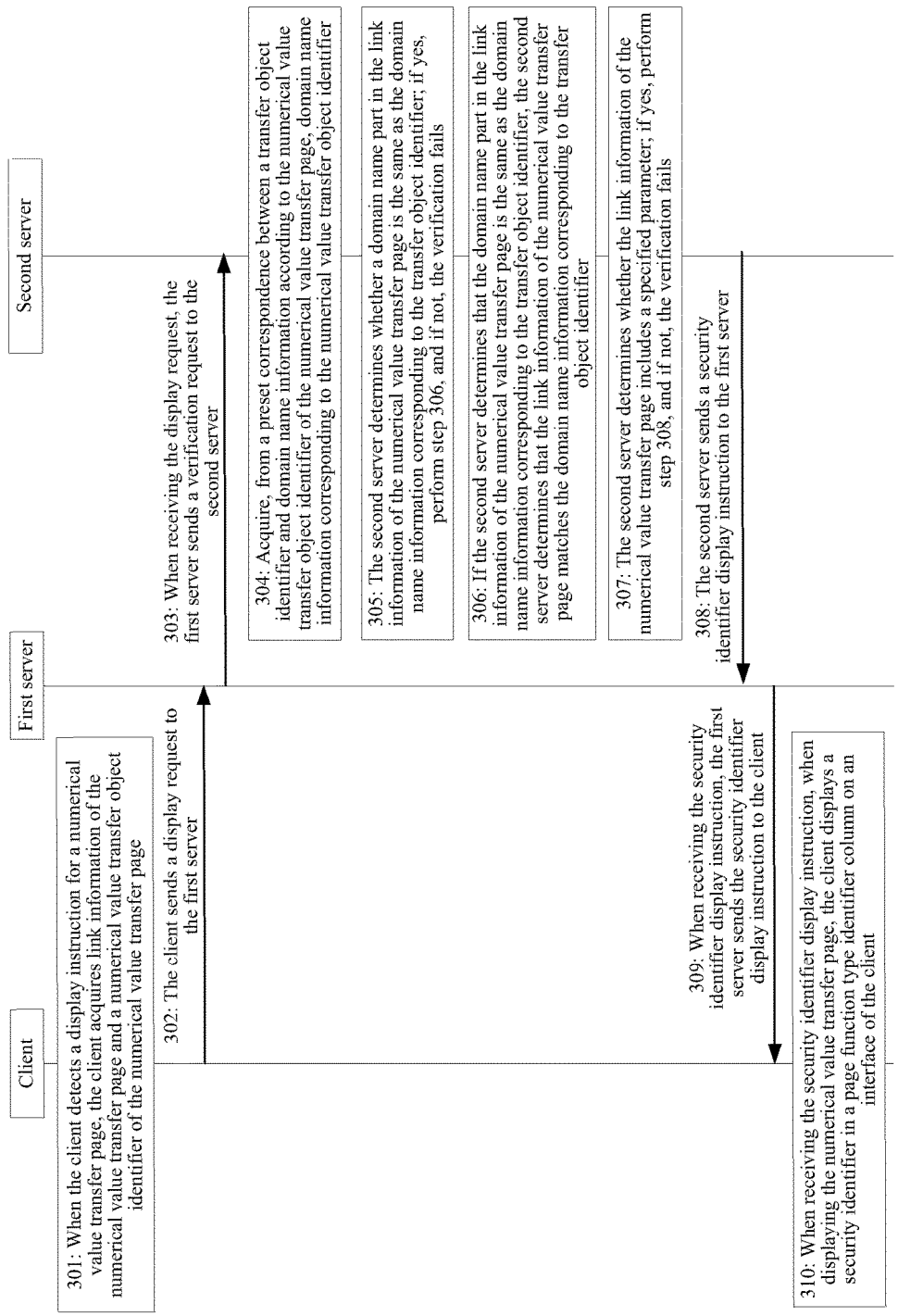
FIG. 3 is a flowchart of another method for displaying a security identifier on a page according to an embodiment of the present disclosure.

Based on the network system shown in FIG. 2, the following describes in detail a method for displaying a security identifier on a page that is provided by an embodiment of the present disclosure. Referring to FIG. 3, this embodiment specifically includes:

301: When the client detects a display instruction for a numerical value transfer page, the client acquires link information of the numerical value transfer page and a numerical value transfer object identifier of the numerical value transfer page.

The link information refers to a URL link of the numerical value transfer page. The numerical value transfer object identifier of the numerical value transfer page refers to a recipient of the numerical value transfer page, for example, a payment scenario is used as an example, when a user A buys a product from an online merchant B, a server of the online merchant B generates a numerical value transfer page; at this time, a numerical value transfer object identifier of the numerical value transfer page is the online merchant B.

Figure 4:
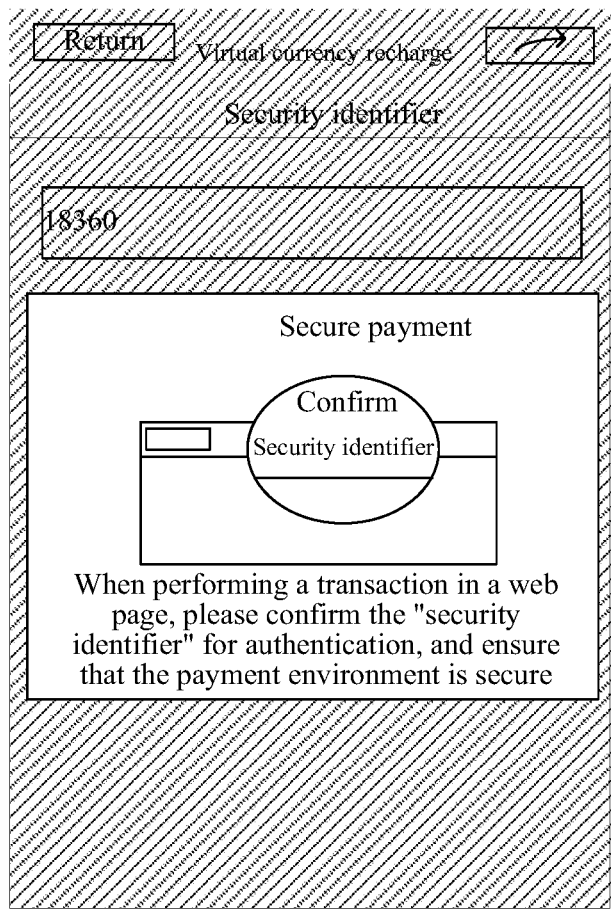
FIG. 4 is a schematic diagram of a prompt message page according to an embodiment of the present disclosure.

The method further includes: generating, by the first server 30, a prompt message page including prompt information and a screenshot of a page function type identifier column including a security identifier. Referring to FIG. 4, the prompt message page may cover the numerical value transfer page in a layer form when the display instruction is received, the security identifier is displayed by using an identifier with a highlighting function, and the security identifier should be displayed at a position on the page function type identifier column. Certainly, the prompt information is not only limited to "When performing a transaction in a web page, please confirm the "security identifier" for authentication, and ensure that the payment environment is secure" shown in FIG. 4, and may also be another prompt, so as to perform security education for a client user, and reinforce the security identifier to the client user, so that before use, the client user can learn how to recognize authenticity of a numerical value transfer page, so as to reduce a loss caused by a fake web page to the user as much as possible.

302: The client sends a display request to the first server, where the display request carries link information of the numerical value transfer page and a numerical value transfer object identifier of the numerical value transfer page, and the link information of the numerical value transfer page includes domain name information of a domain name to which the numerical value transfer page belongs.

A process of sending the display request by the client to the first server may be regarded as a process of accessing the numerical value transfer page by the client.

In this embodiment of the present disclosure, only function separation between the first server and the second server is used as an example for description, and the first server serves as a message forwarding server, and provides a service for the client and the second server. However, in other embodiments provided by the present disclosure, the first server and the second server may also be functional modules located in a same server, and are respectively configured to forward a message and provide verification, and a specific implementation manner is not limited herein.

303: When receiving a display request, the first server sends a verification request to the second server, where the verification request carries the link information of the numerical value transfer page and the numerical value transfer object identifier of the numerical value transfer page.

When determining that the display instruction is received, the first server may start a verification process, and initiate verification to the second server, and because a legal form of the link information of the numerical value transfer page is pre-stored in the second server, the first server needs to send, to the second server, the verification request carrying the link information of the numerical value transfer page and the numerical value transfer object identifier of the numerical value transfer page.

304: When receiving the verification request, the second server acquires, from a preset correspondence between a transfer object identifier and domain name information according to the numerical value transfer object identifier of the numerical value transfer page, domain name information corresponding to the numerical value transfer object identifier.

In this embodiment of the present disclosure, the preset correspondence between a transfer object identifier and domain name information includes a transfer object identifier and legal domain name information of the transfer object identifier. For example, the online merchant B is still used as an example for description, an identifier of the online merchant B is ID-B, in the preset correspondence between a transfer object identifier and domain name information, there is a correspondence between the ID-B and www.url.com/aaa/cgi-bin, that is, legal domain name information of the online merchant B is www.url.com/aaa/cgi-bin.

305: The second server determines whether a domain name part in the link information of the numerical value transfer page is the same as the domain name information corresponding to the transfer object identifier; if yes, perform step 306, and if not, the verification fails.

When the domain name part in the link information of the numerical value transfer page is the same as the domain name information corresponding to the transfer object identifier, it may be regarded that the numerical value transfer page is legal, and subsequent verification may be continued, but if the domain name part in the link information of the numerical value transfer page is not the same as the domain name information corresponding to the transfer object identifier, it may be regarded that there is a security risk in the numerical value transfer page, and the verification fails. Optionally, the second server sends, to the first server, a message used for notifying the first server that the verification fails, so that the first server may reject display of a web page or inform the client user that there is a security risk in the numerical value transfer page.

For example, the online merchant B is still used as an example for description, when the numerical value transfer object identifier received by the second server is ID-B, the second server may determine that the legal domain name information thereof is www.url.com/aaa/cgi-bin, and compares the legal domain name information with the domain name part in the link information of the numerical value transfer page; if the link information of the numerical value transfer page is www.url.com/cgi-bin/cgi?a=1, the domain name part in the link information of the numerical value transfer page is not the same as the domain name information corresponding to the transfer object identifier, but if the link information of the numerical value transfer page is www.url.com/aaa/cgi-bin/cgi?a=1&showwxpaytitle=1, the domain name part in the link information of the numerical value transfer page is the same as the domain name information corresponding to the transfer object identifier, and subsequent verification needs to be performed.

306: If the second server determines that the domain name part in the link information of the numerical value transfer page is the same as the domain name information corresponding to the transfer object identifier, the second server determines that the link information of the numerical value transfer page matches the domain name information corresponding to the transfer object identifier.

In a verification process, for comparison and refinement of the domain name information, in the entire path except cgi, once a path is added or reduced, for example, as shown in the example in step 305, the link information of the numerical value transfer page is www.url.com/cgi-bin/cgi?a=1, the legal domain name information is www.url.com/aaa/cgi-bin, the domain name part in the link information is equivalent to the legal domain name information without "aaa", it is also regarded that the link information of the numerical value transfer page does not match the domain name information corresponding to the transfer object identifier.

307: The second server determines whether the link information of the numerical value transfer page includes a specified parameter; if yes, perform step 308, and if not, the verification fails.

In order to strengthen the verification and provide page security, the link information of the numerical value transfer page needs to be further verified, when it is determined that the link information of the numerical value transfer page matches the domain name information corresponding to the transfer object identifier, it is determined whether the link information of the numerical value transfer page includes the specified parameter, if yes, it is determined that the verification succeeds, and if not, it is determined that the verification fails.

The method further includes: providing, by a server, a preset link information rule for a numerical value transfer object server, so that the numerical value transfer object server adds the specified parameter to the link information according to the preset link information rule when the link information of the numerical value transfer page is generated. The server that provides the rule may be the first server or the second server. When the numerical value transfer object server registers with a service of displaying the security identifier, the server may provide the preset link information rule for the numerical value transfer object server. In addition, the specified parameter is located at a preset part in the link information of the numerical value transfer page, for example, the specified parameter may be located at the tail of the link information.

For example, still based on the example in step 305, when the link information of the numerical value transfer page currently received by the second server is www.url.com/aaa/cgi-bin/cgi?a=1&showwxpaytitle=1, and verification on the domain name part succeeds, it is determined, according to a specified parameter "showwxpaytitle=1", that the link information includes the specified parameter, and the verification succeeds. If a suffix of the link information is another parameter or does not include the specified parameter, the verification fails.

308: The second server sends a security identifier display instruction to the first server.

The security identifier display instruction may be any message, and the message is used for notifying the first server that the verification succeeds, and displaying the security identifier.

Certainly, in a case in which the verification fails in step 307, the second server may further send, to the first server, a message used for notifying the first server that the verification fails, so that the first server may reject display of a web page or inform the client user that there is a security risk in the numerical value transfer page. In an actual scenario, for a link that does not include the specified parameter, although verification on a specified parameter of the link fails, a security risk may not necessarily exist in the numerical value transfer page, and a verification result may be only notified to the first server, so that the first server still normally displays a web page.

309: When receiving the security identifier display instruction, the first server sends the security identifier display instruction to the client.

When it is determined that the link information of the numerical value transfer page includes the specified parameter, if the first server receives the security identifier display instruction sent by the second server, the first server sends the security identifier display instruction to the client, so that the client learns the verification result.

310: When receiving the security identifier display instruction, when displaying the numerical value transfer page, the client displays a security identifier in a page function type identifier column on an interface of the client.

The interface of the client refers to an interface frame provided by the client, and the interface frame includes the page function type identifier column and a border, where the page function type identifier column may display a title of a current page, and the like. A display position of the security identifier may be below the title displayed in the page function type identifier column, or located at another position of the title, which is not limited by this embodiment of the present disclosure.

Figure 5:
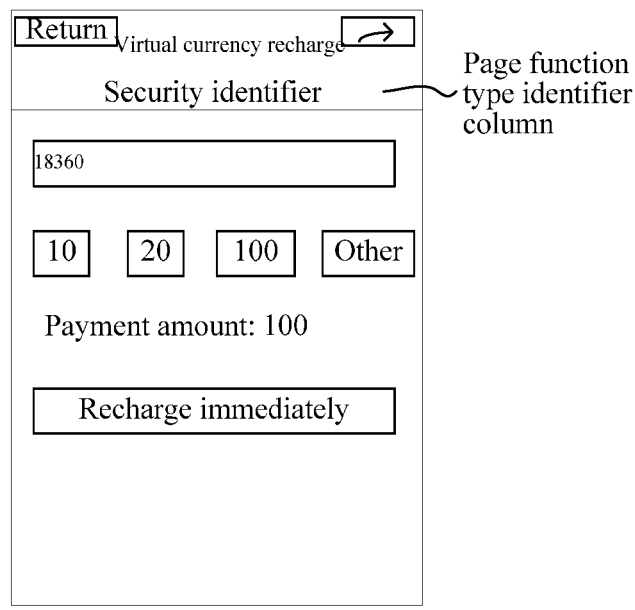
FIG. 5 is a schematic diagram of page display according to an embodiment of the present disclosure.

For example, a scenario of virtual currency recharge is used as an example, referring to FIG. 5, in the scenario of virtual currency recharge, the title in the page function type identifier column in the numerical value transfer page may be "virtual currency recharge", and because the verification succeeds in step 306, the "security identifier" is displayed in the page function type identifier column, to provide, for the client user, an identifier for web page identification.

It should be noted that, the security identifier in this embodiment of the present disclosure may be text, a character, a pattern, or another identifier with a reminding function, and a specific representation of the security identifier is not limited by this embodiment of the present disclosure.

Further, the security identifier display instruction may further carry information such as a display form and a display position of the security identifier, so that when receiving the security identifier display instruction, the client can display the security identifier according to the display form and the display position. Certainly, the client includes a widget for displaying the security identifier, and may display the security identifier based on the display form and the display position carried in the security identifier display instruction, and certainly, the security identifier display instruction may further only carry a security identifier display symbol, for example, if a preset position in the instruction is set to 1, it indicates that the security identifier needs to be displayed, and when receiving the security identifier display instruction, when determining that the preset position is set to 1, the client invokes the widget to display the security identifier in the page function type identifier column on the interface of the client.

According to the method provided by this embodiment of the present disclosure, based on verification on domain name information, link information of a numerical value transfer page is further verified; it is determined, based on whether a specified parameter is included, whether the numerical value transfer page is a page determined by using a numerical value transfer object identifier; when both the verification on the domain name information and the verification on the link information succeed, a security identifier is displayed in a page function type identifier column, which is not easily changed by the outside, on an interface of a client; and the security identifier is displayed in an embedded manner, thereby avoiding web page faking, and improving the security of the numerical value transfer page. Because a client is closed and is not easy to be faked, compared with some manners of adding a security identifier to a web page, the security of an interface of the client is high, and when the security identifier is displayed, more credibility can be improved. Further, because the security of web page display is improved, property security of a user can be effectively ensured.

FIG. 6 is a schematic structural diagram of an apparatus for displaying a security identifier on a page according to an embodiment of the present disclosure. Referring to FIG. 6, the apparatus includes:

a receiving module 601, configured to receive a display request for a numerical value transfer page, where the display request at least carries link information and a numerical value transfer object identifier of the numerical value transfer page, and the link information of the numerical value transfer page includes domain name information of a domain name to which the numerical value transfer page belongs;

a determining module 602, configured to determine, according to a preset correspondence between a transfer object identifier and domain name information, whether the link information of the numerical value transfer page matches domain name information corresponding to the transfer object identifier, where the determining module 602 is further configured to: if the link information of the numerical value transfer page matches the domain name information corresponding to the transfer object identifier, determine whether the link information of the numerical value transfer page includes a specified parameter;

the processing module 603, configured to: if the link information of the numerical value transfer page includes the specified parameter, when displaying the numerical value transfer page in a client, display a security identifier in a page function type identifier column on an interface of the client.

Optionally, the apparatus further includes:

a prompt page generating module, configured to generate a prompt message page including prompt information and a screenshot of the page function type identifier column including the security identifier.

Optionally, the determining module 602 is configured to determine whether a domain name part in the link information of the numerical value transfer page is the same as the domain name information corresponding to the transfer object identifier, where if yes, the link information of the numerical value transfer page matches the domain name information corresponding to the transfer object identifier; and if not, the link information of the numerical value transfer page does not match the domain name information corresponding to the transfer object identifier.

The apparatus further includes:

a rule providing module, configured to provide a preset link information rule for a numerical value transfer object server, so that the numerical value transfer object server adds the specified parameter to the link information according to the preset link information rule when the link information of the numerical value transfer page is generated.

Optionally, the specified parameter is located at a preset part in the link information of the numerical value transfer page.

All the foregoing optional technical solutions may be combined randomly to form optional embodiments of the present disclosure, and details are not described herein again.

It should be noted that, when the apparatus for displaying a security identifier on a page that is provided by the foregoing embodiment displays a security identifier on a page, only the division of the foregoing functional modules is described by using an example, and in an actual application, the foregoing functions may be accomplished by different functional modules according to a requirement, that is, the internal structure of the device is divided into different functional modules, so as to accomplish all or some of the functions in the foregoing description. In addition, the apparatus for displaying a security identifier on a page that is provided by the foregoing embodiment belongs to the same concept as the embodiment of the method for displaying a security identifier on a page, and for the specific implementation process, reference may be made to the method embodiment, and details are not described herein again.

FIG. 7 is a flowchart of a method for displaying a security identifier on a page according to an embodiment of the present disclosure. Referring to FIG. 7, the method includes:

701: A client sends a display request for a numerical value transfer page to a server, where the display request at least carries link information of the numerical value transfer page and a numerical value transfer object identifier of the numerical value transfer page, and the link information of the numerical value transfer page includes domain name information of a domain name to which the numerical value transfer page belongs.

702: When receiving the display request, the server determines, according to a preset correspondence between a transfer object identifier and domain name information, whether the link information of the numerical value transfer page matches domain name information corresponding to the transfer object identifier.

703: If the link information of the numerical value transfer page matches the domain name information corresponding to the transfer object identifier, the server determines whether the link information of the numerical value transfer page includes a specified parameter.

704: If the link information of the numerical value transfer page includes the specified parameter, the server sends a security identifier display instruction to the client.

705: When receiving the security identifier display instruction, when displaying the numerical value transfer page, the client displays a security identifier in a page function type identifier column on an interface of the client.

Optionally, the method further includes:

generating, by the server, a prompt message page including prompt information and a screenshot of a display interface of the security identifier;

sending, by the server, the prompt message page to the client; and when receiving the prompt message page, displaying, by the client, the prompt message page.

Optionally, the method further includes:

providing, by the server, a preset link information rule for a numerical value transfer object server, so that the numerical value transfer object server adds the specified parameter to the generated link information according to the preset link information rule when the link information of the numerical value transfer page is generated.

Figure 8:
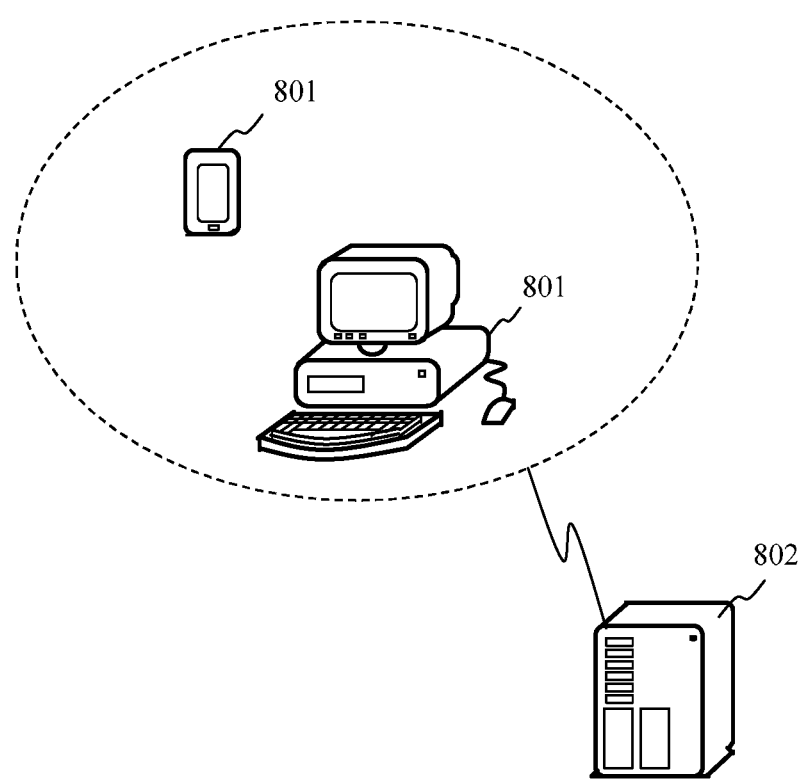
FIG. 8 is a schematic structural diagram of a network system according to an embodiment of the present disclosure.

FIG. 8 is a schematic structural diagram of a network system according to an embodiment of the present disclosure. Referring to FIG. 8, the system includes: a client 801 and a server 802.

The client is configured to send a display request for a numerical value transfer page to the server, where the display request at least carries link information of the numerical value transfer page and a numerical value transfer object identifier of the numerical value transfer page, and the link information of the numerical value transfer page includes domain name information of a domain name to which the numerical value transfer page belongs.

The server is configured to: when receiving the display request, determining, according to a preset correspondence between a transfer object identifier and domain name information, whether the link information of the numerical value transfer page matches domain name information corresponding to the transfer object identifier; if the link information of the numerical value transfer page matches the domain name information corresponding to the transfer object identifier, determine whether the link information of the numerical value transfer page includes a specified parameter; and if the link information of the numerical value transfer page includes the specified parameter, send a security identifier display instruction to the client.

The client is further configured to: when receiving the security identifier display instruction, when displaying the numerical value transfer page, display a security identifier in a page function type identifier column on an interface of the client.

Optionally, the server is further configured to generate a prompt message page including prompt information and a screenshot of a display interface of the security identifier, and send the prompt message page to the client.

The client is further configured to: when receiving the prompt message page, display the prompt message page.

Optionally, the server is further configured to provide a preset link information rule for a numerical value transfer object server, so that the numerical value transfer object server adds the specified parameter to the generated link information according to the preset link information rule when the link information of the numerical value transfer page is generated.

A person of ordinary skill in the art may understand that all or some of the steps of the embodiments may be implemented by hardware or may be implemented by a program instructing relevant hardware. The program may be stored in a computer readable storage medium. The storage medium may be a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for displaying a security identifier on a page, comprising:

receiving a display request for a numerical value transfer page, wherein the display request at least carries link information and a numerical value transfer object identifier of the numerical value transfer page, and the link information of the numerical value transfer page comprises domain name information of a domain name to which the numerical value transfer page belongs;

determining, according to a preset correspondence between a transfer object identifier and domain name information, whether the link information of the numerical value transfer page matches domain name information corresponding to the transfer object identifier;

when the link information of the numerical value transfer page matches the domain name information corresponding to the transfer object identifier, determining whether the link information of the numerical value transfer page comprises a specified parameter;

when the link information of the numerical value transfer page comprises the specified parameter, when displaying the numerical value transfer page in a client, displaying a security identifier in a page function type identifier column on an interface of the client; and providing a preset link information rule for a numerical value transfer object server, so that the numerical value transfer object server adds the specified parameter to the link information according to the preset link information rule when the link information of the numerical value transfer page is generated;

wherein the specified parameter is located at a preset part in the link information of the numerical value transfer page.

2. The method according to claim 1, wherein the method further comprises: generating a prompt message page comprising prompt information and a screenshot of the page function type identifier column comprising the security identifier.

3. The method according to claim 1, wherein the determining whether the link information of the numerical value transfer page matches domain name information corresponding to the transfer object identifier comprises:

determining whether a domain name part in the link information of the numerical value transfer page is the same as the domain name information corresponding to the transfer object identifier, wherein when yes, the link information of the numerical value transfer page matches the domain name information corresponding to the transfer object identifier; and when not, the link information of the numerical value transfer page does not match the domain name information corresponding to the transfer object identifier.

4. An apparatus for displaying a security identifier on a page, comprising: a storage and a hardware processor;
wherein the processor is to execute machine readable instructions in the storage to:
receive a display request for a numerical value transfer page, wherein the display request at least carries link information and a numerical value transfer object identifier of the numerical value transfer page, and the link information of the numerical value transfer page comprises domain name information of a domain name to which the numerical value transfer page belongs;
determine, according to a preset correspondence between a transfer object identifier and domain name information, whether the link information of the numerical value transfer page matches domain name information corresponding to the transfer object identifier, wherein
when the link information of the numerical value transfer page matches the domain name information corresponding to the transfer object identifier, determine whether the link information of the numerical value transfer page comprises a specified parameter;
when the link information of the numerical value transfer page comprises the specified parameter, when displaying the numerical value transfer page in a client, display a security identifier in a page function type identifier column on an interface of the client; and
wherein the processor is further to execute the machine readable instructions in the storage to: provide a preset link information rule for a numerical value transfer object server, so that the numerical value transfer object server adds the specified parameter to the link information according to the preset link information rule when the link information of the numerical value transfer page is generated;
wherein the specified parameter is located at a preset part in the link information of the numerical value transfer page.

5. The apparatus according to claim 4, wherein the processor is further to execute the machine readable instructions in the storage to:
generate a prompt message page comprising prompt information and a screenshot of the page function type identifier column comprising the security identifier.

6. The apparatus according to claim 4, wherein the processor is further to execute the machine readable instructions in the storage to: determine whether a domain name part in the link information of the numerical value transfer page is the same as the domain name information corresponding to the transfer object identifier, wherein when yes, the link information of the numerical value transfer page matches the domain name information corresponding to the transfer object identifier; and when not, the link information of the numerical value transfer page does not match the domain name information corresponding to the transfer object identifier.

7. A method for displaying a security identifier on a page, wherein the method comprises:
sending a display request for a numerical value transfer page to a server, wherein the display request at least carries link information of the numerical value transfer page and a numerical value transfer object identifier of the numerical value transfer page, and the link information of the numerical value transfer page comprises domain name information of a domain name to which the numerical value transfer page belongs;
when receiving the display request, determining, according to a preset correspondence between a transfer object identifier and domain name information, whether the link information of the numerical value transfer page matches domain name information corresponding to the transfer object identifier;
when the link information of the numerical value transfer page matches the domain name information corresponding to the transfer object identifier, determining whether the link information of the numerical value transfer page comprises a specified parameter;
when the link information of the numerical value transfer page comprises the specified parameter, sending a security identifier display instruction to the client;
when receiving the security identifier display instruction, when displaying the numerical value transfer page, displaying a security identifier in a page function type identifier column on an interface of the client; and
providing, by the server, a preset link information rule for a numerical value transfer object server, so that the numerical value transfer object server adds the specified parameter to the generated link information according to the preset link information rule when the link information of the numerical value transfer page is generated;
wherein the specified parameter is located at a preset part in the link information of the numerical value transfer page.

8. The method according to claim 7, wherein the method further comprises:
generating a prompt message page comprising prompt information and a screenshot of a display interface of the security identifier;
sending the prompt message page to the client; and
when receiving the prompt message page, displaying the prompt message page.

* * * * *